US006621531B2

(12) United States Patent
Cooper et al.

(10) Patent No.: US 6,621,531 B2
(45) **Date of Patent: *Sep. 16, 2003**

(54) DISPLAY DEVICE CONVERTIBLE BETWEEN A CAVE CONFIGURATION AND A WALL CONFIGURATION

(75) Inventors: David E. Cooper, Tremont, IL (US); Kevin M. Egle, Peoria, IL (US); Warren J. Hartmann, Peoria, IL (US); Francis B. Huck, Jr., Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/262,708

(22) Filed: Oct. 2, 2002

(65) Prior Publication Data

US 2003/0025647 A1 Feb. 6, 2003

Related U.S. Application Data

(63) Continuation of application No. 09/216,408, filed on Dec. 18, 1998, now Pat. No. 6,490,011.

(51) Int. Cl.[7] .................................................. H04N 5/64
(52) U.S. Cl. ......................... 348/839; 348/840; 312/7.2
(58) Field of Search ................................ 348/836, 839, 348/840; 312/7.2; 434/38, 44, 69

(56) References Cited

U.S. PATENT DOCUMENTS 3,514,871 A * 6/1970 Tucker ........................ 434/44
4,760,388 A * 7/1988 Tatsumi et al. ............... 434/69
5,137,450 A * 8/1992 Thomas ....................... 434/44
5,184,956 A * 2/1993 Langlais et al. .............. 434/69
5,187,586 A * 2/1993 Johnson ...................... 348/836
5,275,565 A * 1/1994 Moncrief ..................... 434/69
5,363,149 A * 11/1994 Furuno et al. ............... 312/7.2
5,523,790 A * 6/1996 Kalua ......................... 348/836
5,537,127 A * 7/1996 Jingu ......................... 361/682
5,631,715 A * 5/1997 Kirkpatrick et al. ........ 348/839
5,654,776 A * 8/1997 Furuya ....................... 348/840
5,818,639 A * 10/1998 Furuya ....................... 348/836
5,927,985 A * 7/1999 Lechner ....................... 434/44

FOREIGN PATENT DOCUMENTS

JP 403273278 * 12/1991 .................. 434/38
JP 405224585 * 9/1993 .................. 434/69

* cited by examiner

*Primary Examiner*—Lanna Mai
*Assistant Examiner*—Hanh V. Tran
(74) *Attorney, Agent, or Firm*—Steve D Lundquist; Robin S Fahlberg

(57) ABSTRACT

A method for converting a wall configuration of a display device to a cave configuration, the display device including a first display module having a display screen including first and second opposite peripheral edges and means for displaying an image on the display screen, a second display module having a display screen including a peripheral edge and means for displaying an image on the display screen, and a third display model having a display screen including a peripheral edge and means for displaying an image on the display screen. Additionally the invention includes a method for converting a cave configuration of a display device to a wall configuration.

17 Claims, 8 Drawing Sheets

DISPLAY DEVICE CONVERTIBLE BETWEEN A CAVE CONFIGURATION AND A WALL CONFIGURATION

This application is a continuation of application Ser. No. 09/216,408, filed Dec. 18, 1998, now U.S. Pat. No. 6,490, 011.

TECHNICAL FIELD

This invention relates generally to cave type display devices for simulation and virtual reality applications and wall type display devices for wide screen display applications, and more particularly, to a display device convertible between a cave configuration and a wall configuration.

BACKGROUND

Currently, display devices including a plurality of display screens for creating an immersive environment for simulation and virtual reality applications include relatively small CRT or LCD monitors fixed or movable in desired angular relation to one another, or much larger projection type devices fixed in an angularly related arrangement known as a cave configuration. The smaller display devices have proven quite useful for applications such as virtual reality games and driver training, wherein the display devices can be positioned relatively closely to the operator and small angular adjustments can be made between the monitors as required. Further, for simulation of another direction, such as a rearward direction after simulating forward and side directions, one of the small monitors can be repositioned at a more rearward location to provide the desired directional view.

The known cave type devices, however, typically used for instance where the operation of a large machine such as a construction machine, mining machine, or earthmoving machine or the like is to be simulated, due to the large size of the projector type displays used and operator control area required, do not provide such display screen mobility.

Similarly, the known wall type display devices, that is, devices wherein several large display screens are arranged in side by side, generally coplanar relation, are also dedicated arrangements.

A problem with dedicated cave type display devices and wall type devices is that due to the large size of the projection display devices used, a correspondingly large area is required. Thus, if it is desired to have both a cave capability and a wall capability, a correspondingly large space is required.

Accordingly, the present invention is directed to overcoming one or more of the problems as set forth above.

SUMMARY OF THE INVENTION

A display device convertible between a cave configuration and a wall configuration is disclosed. The present display device includes a first display module having a display screen including first and second opposite peripheral edges and means for displaying an image on the display screen. The display device includes a second display module having a display screen including a peripheral edge and means for displaying an image on the display screen, and a third display module having a display screen including a peripheral edge and means for displaying an image on the display screen, wherein the second and third display modules are positionable with the respective peripheral edges of the display screens thereof in abutting relation to the display screen of the first display module with all of the display screens generally coplanar in the wall configuration, and wherein the second and third display modules are positionable with the respective peripheral edges of the display screens thereof in abutting relation to the display screen of the first display module and the display screens of the second and third display modules angularly related to the display screen of the first display module in the cave configuration.

DETAILED DESCRIPTION

Figure 1:
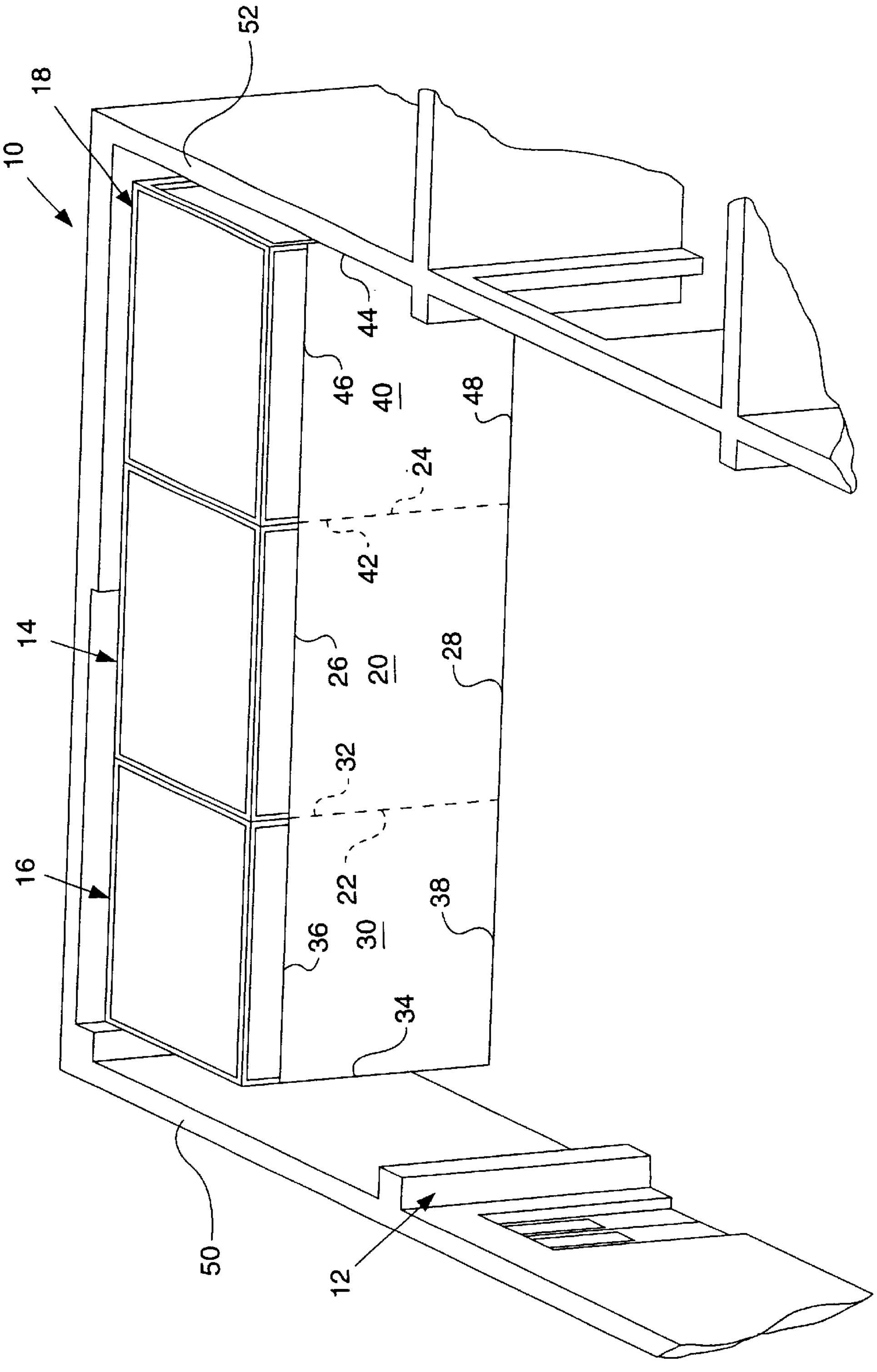
FIG. 1 is a perspective view of a convertible display device according to the present invention shown arranged in a wall configuration.

Referring now to the drawings, number 10 identifies a convertible display device constructed and operable according to the teachings of the present invention in a wall configuration at one end of a room 12. Convertible display device 10 includes a first display module 14 disposed in side by side, abutting relation with a second display module 16 and a third display module 18. First display module 14 includes a generally planar display screen 20 having a first peripheral edge 22 and an opposite second peripheral edge 24, and top and bottom peripheral edges 26 and 28, respectively, extending therebetween. Second display module 16 includes a generally planar display screen 30 including a first peripheral edge 32, and opposite second peripheral edge 34, and top and bottom peripheral edges 36 and 38 extending therebetween. Further, third display module 18 includes a generally planar display screen 40 having a first peripheral edge 42, an opposite second peripheral edge 44, and top and bottom peripheral edges 46 and 48 respectively, extending therebetween. In the wall configuration as shown, display screens 20, 30 and 40 are substantially coplanar, first peripheral edge 22 of display screen 20 being in abutment with first peripheral edge 32 of display screen 30, and second peripheral edge 24 of display screen 20 being located in abutment with first peripheral edge 42 of display screen 40, providing a substantially continuous display screen or wall extending substantially the width of room 12 between opposite walls 50 and 52 thereof.

Importantly, first display module 14, second display module 16 and third display module 18 are separate, individual units which can be arranged as shown in a wall configuration, or, arranged in angularly related positions in a cave configuration.

Figure 2:
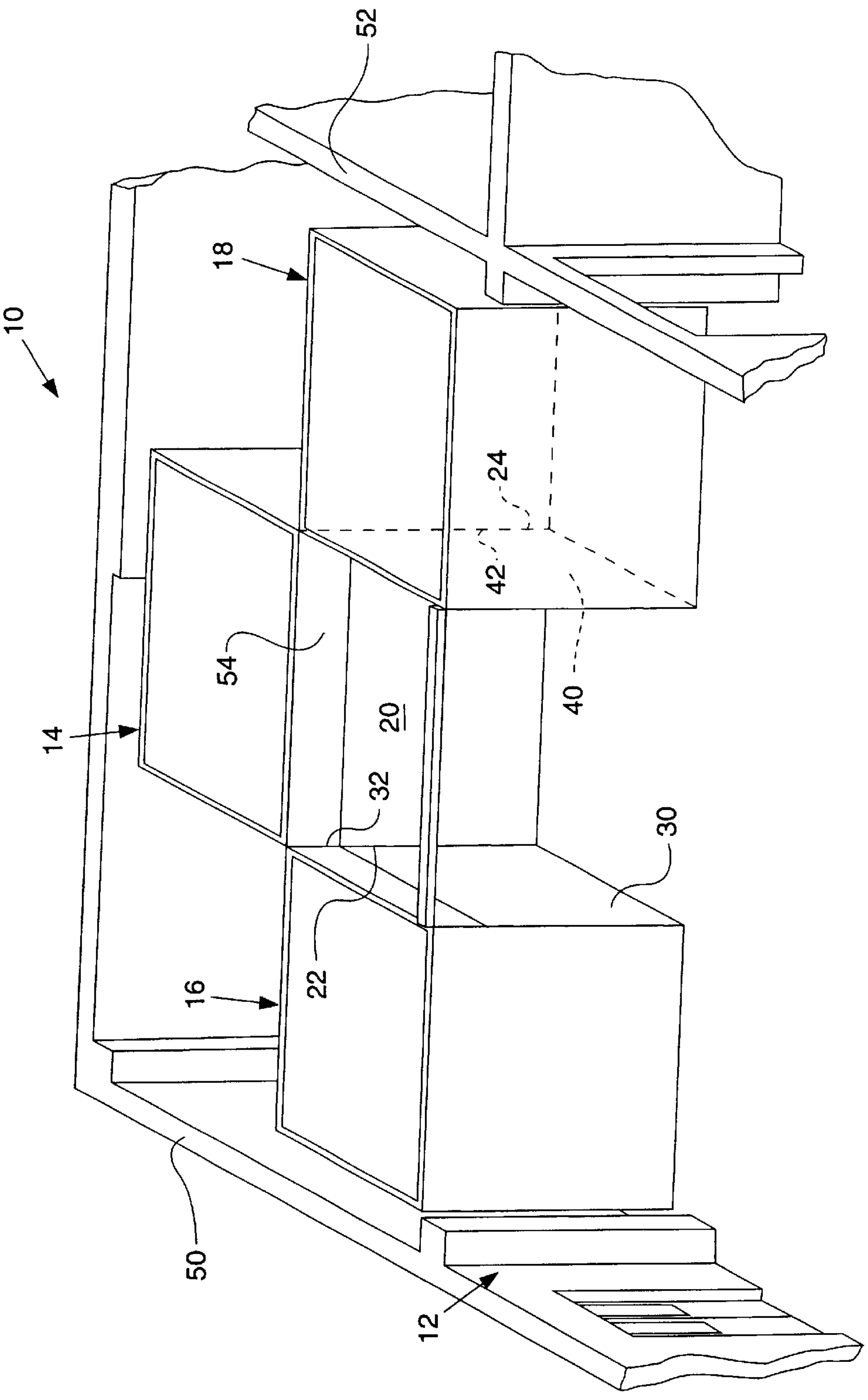
FIG. 2 is a perspective view of the convertible display device of FIG. 1 in a first cave configuration.

Turning to FIG. 2, modules 14, 16 and 18 are shown in one possible cave configuration, module 14 remaining in a central location, module 16 being positioned with first peripheral edge 32 of screen 30 in abutting relation to first peripheral edge 22 of display screen 20 of module 14, screens 20 and 30 being angularly orientated at about a right angle to one another. Similarly, first peripheral edge 42 of display screen 40 of module 18 is located in abutting, edge to edge relation to second peripheral edge 24 of screen 20, screens 20 and 40 being angularly oriented at about a right angle to each other, screen 40 being in opposing relation to screen 30.

Figure 3:
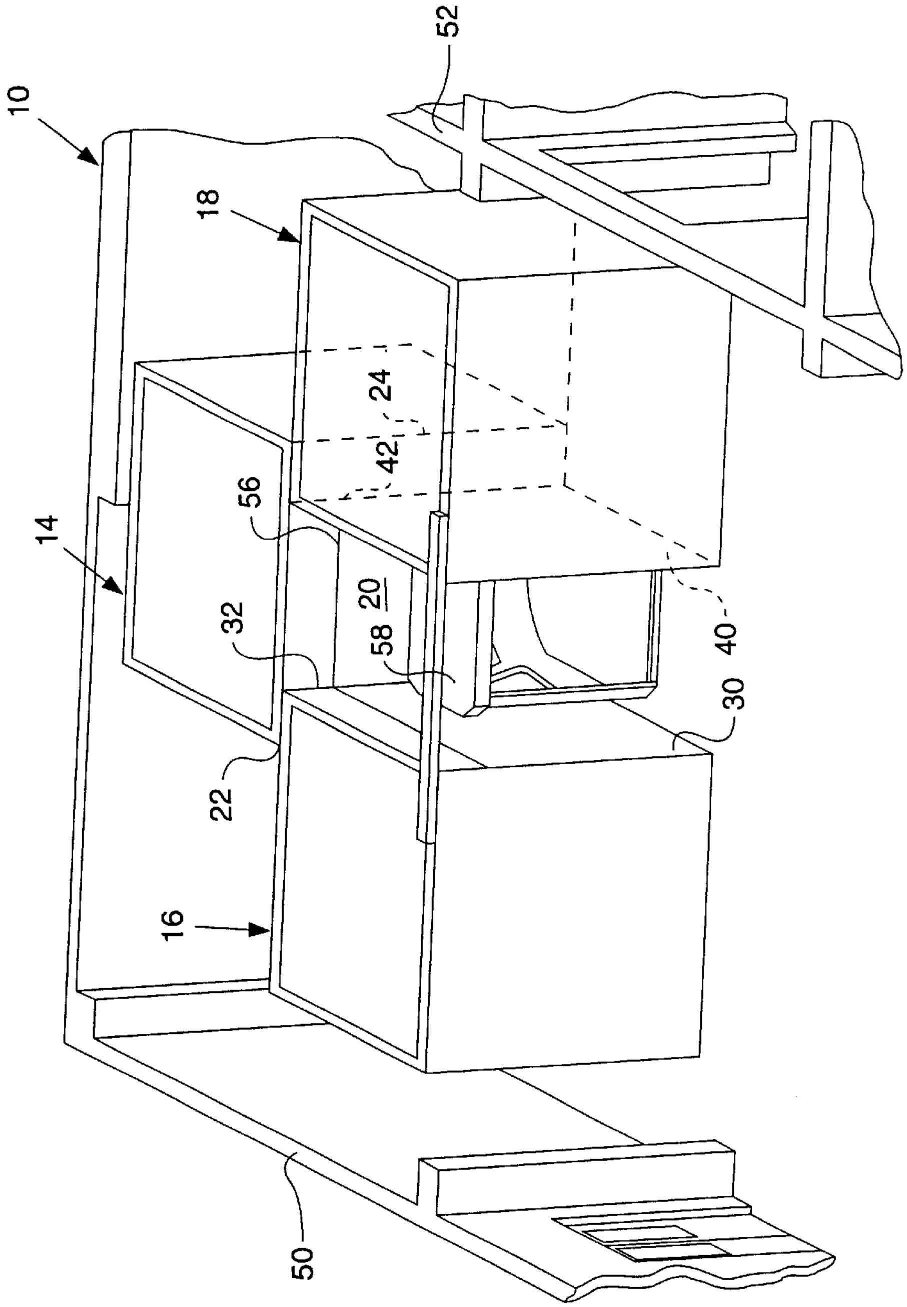
FIG. 3 is a perspective view of the convertible display device of FIG. 1 in a second cave configuration in association with a machine cab.

Referring to FIG. 3, display device 10 is shown in still another alternative cave configuration, module 14 remaining in its central location and modules 16 and 18 being positioned with first peripheral edges 32 and 42 thereof positioned abutting, substantially right angle relation to screen 20 of display module 14, spaced from first peripheral edge 22 and second peripheral edge 24 thereof. Comparing the configurations shown in FIGS. 2 and 3, modules 14, 16 and 18 in FIG. 2 define a space 54 which corresponds in width to the width of screen 20 of module 14, a depth corresponding to the width of screens 30 and 40, and a height corresponding to the uniform height of all three modules 14, 16, and 18. In the configuration shown in FIG. 3, modules 14, 16, and 18 define a space 56 which is substantially narrower than display screen 20, but which has the same depth and height as space 54. Both space 54 and space 56 are adapted for use in a wide variety of immersive environments, for virtual reality training, simulation, and the like. For instance, in FIG. 3, a machine operator cab 58 is shown disposed in space 56 for a machine operation simulation.

Figure 4:
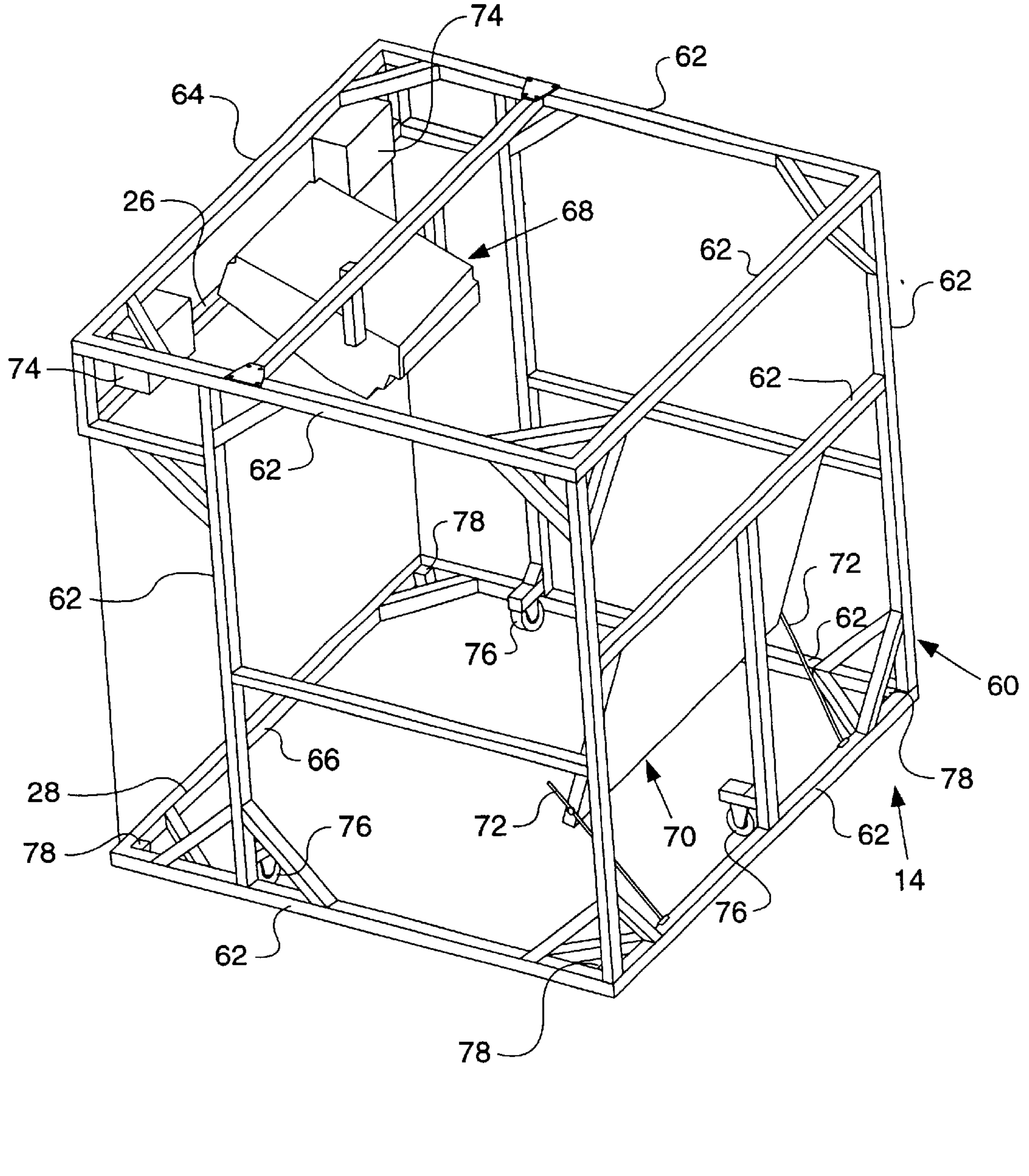
FIG. 4 is a perspective view of a first display module of the display device of FIG. 1.

Referring to FIG. 4, first display module 14 is shown. Display module 14 is a generally rectangular box shaped structure defined by a space frame 60 constructed of a plurality of rigid, elongate beams 62. Space frame 60 supports a top channel member assembly 64 and a bottom channel assembly 66 each having channels for cooperatively receiving and clamping the respective top peripheral edge 26 and bottom peripheral edge 28 of display screen 20 for holding the display screen in the position shown. Top channel assembly 64 additionally partially supports a video projector 68 as shown for projecting a video image onto a mirror 70 supported at an angular orientation with respect to display screen 20 for reflecting the image toward the display screen. The top of mirror 70 is hingedly mounted to a horizontal beam 62, and the bottom of the mirror is supported by a pair of support rods 72 which allow adjusting the angle of mirror 70 relative to display screen 20 and video projector 68. Display module 14 additionally includes a pair of speakers 74 supported on opposite sides of video projector 68 for providing sound to accompany video images projected on display screen 20. A plurality of casters 76 are mounted to space frame 60 at spaced locations therearound to allow easily rolling display module 14 on a floor or other surface, such as a floor of room 12, for positioning the display module at a desired location. Additionally, a plurality of leveling feet 78 are mounted to space frame 60 adjacent the bottom corners thereof, each leveling foot being adjustable for positioning the corner of the space frame at a desired elevation.

Figure 5:
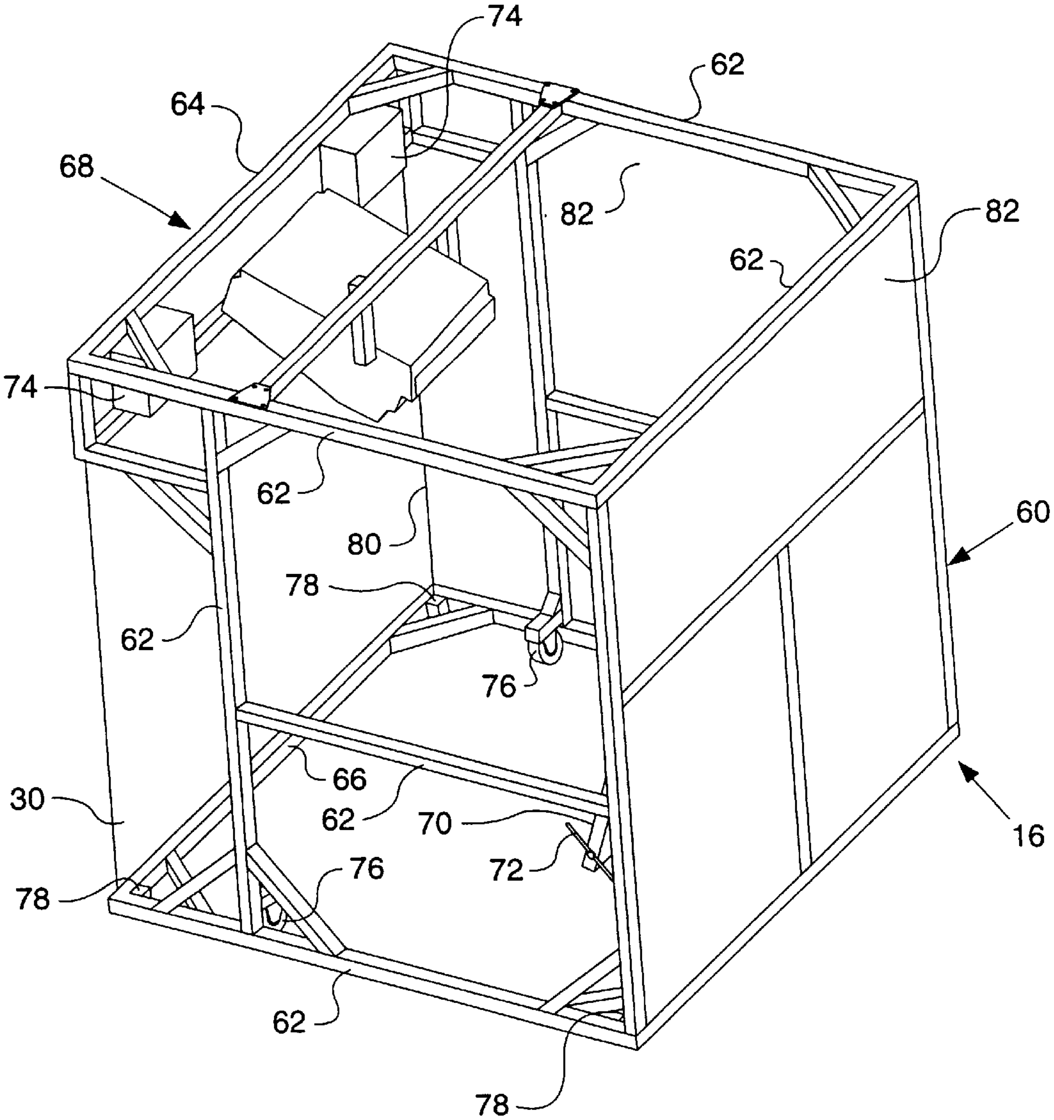
FIG. 5 is a perspective view of a second display module of the device of FIG. 1.

FIG. 5 shows second display module 16. Second display module 16, like display module 14, includes a space frame 60 constructed of a plurality of beams 62. Display module 16 likewise includes a video projector 68 for projecting a video image against a mirror 70 for reflection to display screen 30. Mirror 70 is adjustably supported by a plurality of support rods 72. A pair of speakers 74 are located above display screen 30, and casters 76 and leveling feet 78 are provided for moving and positioning display module 16, as explained above. Display screen 30 of module 16 is supported at the top and bottom by top and bottom channel assemblies 64 and 66 respectively as explained above, and additionally second peripheral edge 34 is clamped in a side channel assembly 80 to provide additional support.

Here, it should be noted that to minimize light contamination of the images projected on display screen 20 of display module 14, display screen 30 of display module 16 and display screen 40 of display module 18, the tops sides and rears of the respective space frames 60 of the modules 14, 16 and 18 are covered with a light barrier, such as the light impermeable plastic films 82 shown on one side and the rear of space frame 60 of module 16.

Third display module 18 is a mirror image of second display module 16, just described.

Figure 6:
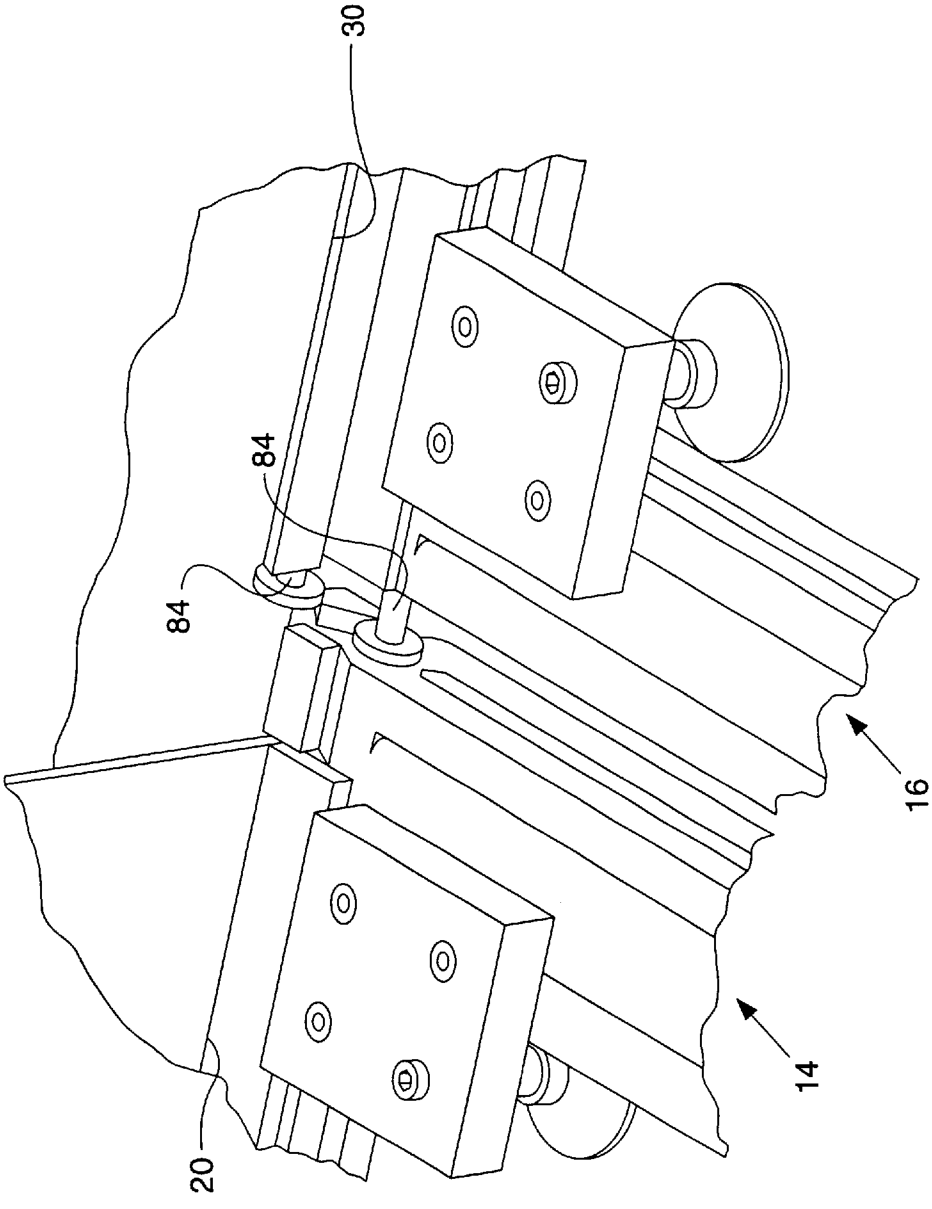
FIG. 6 is a perspective view of the first display module and the second display module of the device of FIG. 1.

FIG. 6 shows second display module 16 positioned with screen 30 thereof in edge to edge, coplanar abutment with display screen 20 of module 14, module 16 including adjustable bumpers 84 positionable in abutting contact with a mating surface on module 14 for achieving a desired alignment between screens 20 and 30. Likewise, module 18 includes bumpers 84 in the same position, for aligning screen 40 with screen 20.

Figure 7:
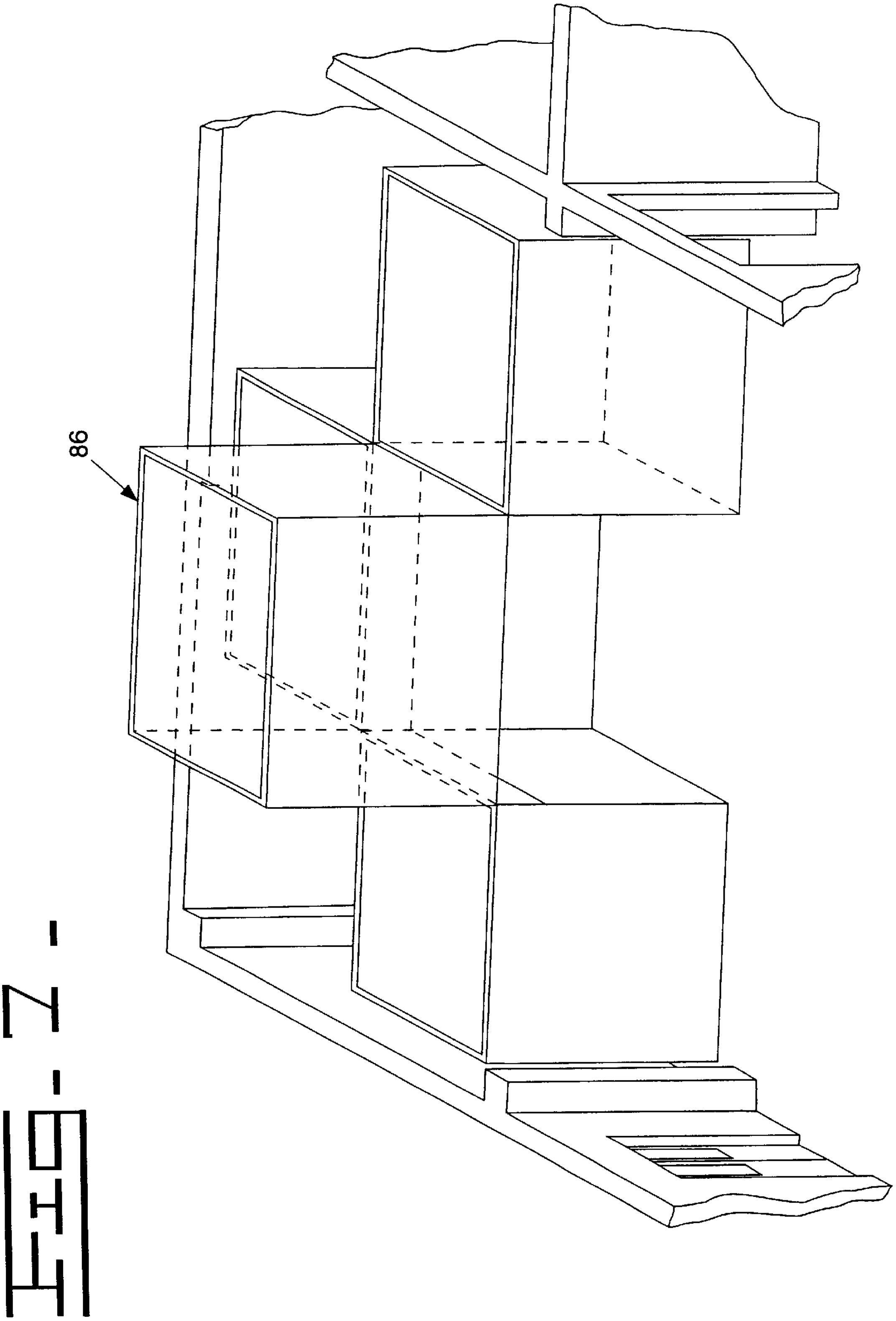
FIGS. 7–8 are perspective views of a convertible display device of FIG. 1 in addition cave configurations.
Figure 8:
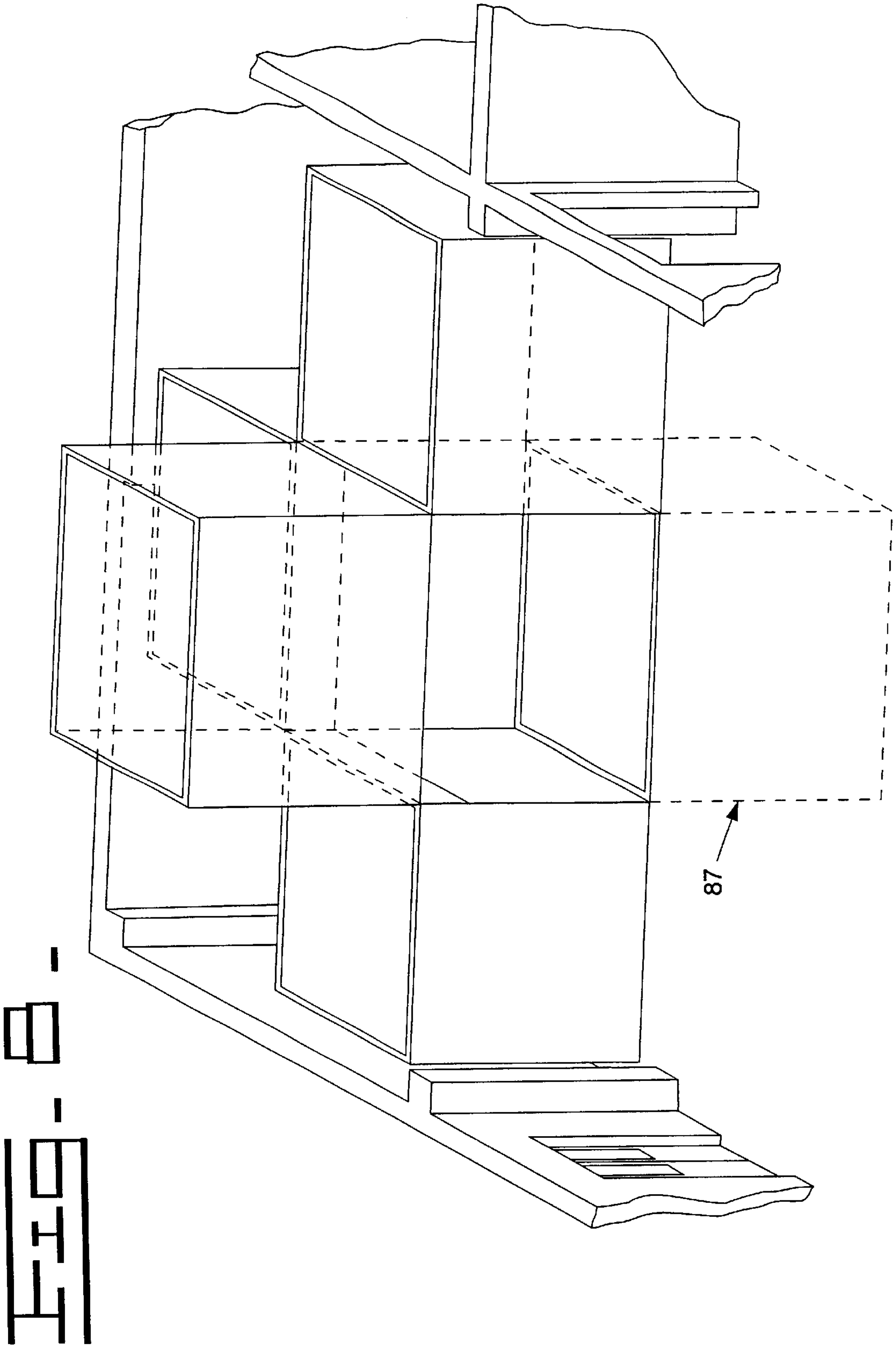

Display screens 20, 30 and 40 are each preferably substantially rigid panels of substantially translucent polymeric material, such as Plexiglas, coated with materials for achieving desired contrast and specular characteristics for a desired video image as commercially available from Draper Screen Corp. of Ohio. Video projectors 68 are likewise conventionally constructed and operable video projector devices, such as available from Sony Corp. for generating simultaneous, coordinated video images on display screens 20, 30 and 40 to provide a broad scope continuous video image when device 10 is configured as shown in FIG. 1, and to provide an immersive, virtual reality image when configured as shown in FIGS. 2 and 3, the modules 14, 16 and 18 being easily moveable within a combined area, such as room 12 to achieve the configurations shown. Referring to FIG. 7, display device 10 can include additional modules constructed in the above described manner of enclosing space 54, or space 56 (FIG. 3), such a top module 86 supported using suitable means above the space. Additional modules can also be located beneath space 54 or 56, as shown in FIG. 8, or in front of the space, as desired.

Industrial Applicability

The convertible display device constructed and operable according to the teachings of the present invention has utility for a wide variety of broad screen and immersive environment applications, particularly where versatility to configure the device in both types of configurations in a limited space is desired.

Other aspects, objects and advantages of the present invention can be obtained from a study of the drawings, the disclosure and the appended claims.

What is claimed is:

1. A method for converting a wall configuration of a display device to a cave configuration, the display device including a first display module having a display screen including first and second opposite peripheral edges and means for displaying an image on the display screen, a second display module having a display screen including a peripheral edge and means for displaying an image on the display screen, and a third display module having a display screen including a peripheral edge and means for displaying an image on the display screen, comprising the step of:

moving the second and third display modules from a position with the respective peripheral edges of the display screens thereof in abutting relation to the display screen of the first display module with all of the display screens generally coplanar in the wall configuration, to a position with the respective peripheral edges of the display screens of the second and third display modules in abutting relation to the display screen of the first display module with all of the display screens being angularly related to define a generally three-dimensional cave configuration.

2. The method, as set forth in claim 1, wherein the display device further comprises a fourth display module, where in the cave configuration the angularly related display screens define a space, further comprising the step of:

positioning the fourth display module above the space.

3. The method, as set forth in claim 1, wherein the display device further comprises a fourth display module, where in the cave configuration the angularly related display screens define a space, further comprising the step of:

locating the fourth display module beneath the space.

4. The method, as set forth in claim 1, wherein the display screen of each of the second and third display modules includes an opposite peripheral edge opposite the first named peripheral edge and a top peripheral edge and a bottom peripheral edge extending between the first named peripheral edge and the opposite peripheral edge, and a support frame supporting the display screen along the top and bottom peripheral edges and the opposite peripheral edge.

5. The method, set forth in claim 1, wherein each of the display screens comprises a translucent material, each of the display modules includes a mirror located behind the display screen in spaced relation thereto and a projector operable to project a visual image at the mirror for reflection through the screen.

6. The method, as set forth in claim 5, wherein the mirror of each display module is adjustably mounted for movement relative to the projector and the display screen of the module.

7. The method, as set forth in claim 1, wherein at least the second and third display modules each includes at least one caster positioned for supporting the module for movement along a floor or other horizontal surface.

8. The method, as set forth in claim 1, wherein at least one of the display modules includes at least one leveling foot adjustable for aligning the module with another of the modules.

9. The method, as set forth in claim 1, wherein at least one of the display modules includes an adjustable bumper for engaging another of the display modules when the respective display screens thereof are located in abutting relation for aligning the display screens.

10. The method, as set forth in claim 1, where in the cave configuration the second and third display modules are positionable with the respective peripheral edges of the display screens thereof in abutting relation to the display screen of the first display module adjacent to the respective peripheral edges thereof or in spaced relation thereto to allow adjusting the width of the cave.

11. A method for converting a cave configuration of a display device to a wall configuration, the display device including a first display module having a display screen including first and second opposite peripheral edges and means for displaying an image on the display screen, a second display module having a display screen including a peripheral edge and means for displaying an image on the display screen, and a third display module having a display screen including a peripheral edge and means for displaying an image on the display screen, comprising the step of:

moving the second and third display modules from a position with the respective peripheral edges of the display screens of the second and third display modules in abutting relation to the display screen of the first display module with all of the display screens being angularly related to define a generally three-dimensional cave configuration, to a position with the respective peripheral edges of the display screens of the second and third display modules in abutting relation to the display screen of the first display module with all of the display screens generally coplanar.

12. The method, as set forth in claim 11, wherein the display screen of each of the second and third display modules includes an opposite peripheral edge opposite the first named peripheral edge and a top peripheral edge and a bottom peripheral edge extending between the first named peripheral edge and the opposite peripheral edge, and a support frame supporting the display screen along the top and bottom peripheral edges and the opposite peripheral edge.

13. The method, set forth in claim 11, wherein each of the display screens comprises a translucent material, each of the display modules includes a mirror located behind the display screen in spaced relation thereto and a projector operable to project a visual image at the mirror for reflection through the screen.

14. The method, as set forth in claim 13, wherein the mirror of each display module is adjustably mounted for movement relative to the projector and the display screen of the module.

15. The method, as set forth in claim 11, wherein at least the second and third display modules each includes at least one caster positioned for supporting the module for movement along a floor or other horizontal surface.

16. The method, as set forth in claim 11, wherein at least one of the display modules includes at least one leveling foot adjustable for aligning the module with another of the modules.

17. The method, as set forth in claim 11, wherein at least one of the display modules includes an adjustable bumper for engaging another of the display modules when the respective display screens thereof are located in abutting relation for aligning the display screens.

* * * * *